United States Patent
Denpo et al.

(10) Patent No.: US 7,019,896 B2
(45) Date of Patent: Mar. 28, 2006

(54) POLAR-AXIS TELESCOPE AND EQUATORIAL TELESCOPE MOUNT INCLUDING THE SAME

(75) Inventors: Atsushi Denpo, Saitama (JP); Satoru Nemoto, Saitama (JP)

(73) Assignee: PENTAX Corporation, Tokyo (JP)

( * ) Notice: Subject to any disclaimer, the term of this patent is extended or adjusted under 35 U.S.C. 154(b) by 23 days.

(21) Appl. No.: 10/743,911

(22) Filed: Dec. 24, 2003

(65) Prior Publication Data

US 2004/0136061 A1    Jul. 15, 2004

(30) Foreign Application Priority Data

Dec. 27, 2002    (JP)    ............................ P2002-382480

(51) Int. Cl.
*G02B 23/00*    (2006.01)

(52) U.S. Cl. ....................................... 359/430; 359/422

(58) Field of Classification Search ................ 359/399, 359/429, 430, 422, 683, 691

See application file for complete search history.

(56) References Cited

U.S. PATENT DOCUMENTS

| 4,842,395 | A | * | 6/1989 | Sato et al. | ................... 359/380 |
| 5,956,177 | A | * | 9/1999 | Nishikata et al. | ........... 359/430 |
| 6,778,330 | B1 | * | 8/2004 | Abe | ........................... 359/685 |

FOREIGN PATENT DOCUMENTS

| JP | 36-8859 | 4/1961 |
| JP | 9-281408 | 10/1997 |

* cited by examiner

*Primary Examiner*—Mark A. Robinson
*Assistant Examiner*—Alessandro Amari
(74) *Attorney, Agent, or Firm*—Greenblum & Bernstein, P.L.C.

(57) ABSTRACT

The polar-axis telescope has an objective lens, a focal plate, an eyepiece, a zoom optical system, and a zoom optical system driver. The objective lens forms an object image, and the focal plate is arranged on a focal plane of the objective lens. The eyepiece is arranged backward of the focal plate and forms an observed image. The zoom optical system is arranged between the objective lens and the eyepiece. The zoom optical system makes the observed image appear gradually bigger while maintaining an in-focus situation. The zoom optical system driver shifts the zoom optical system along a polar-axis, corresponding to an optical axis of the polar-axis telescope, so as to change a magnification.

20 Claims, 6 Drawing Sheets

POLAR-AXIS TELESCOPE AND EQUATORIAL TELESCOPE MOUNT INCLUDING THE SAME

BACKGROUND OF THE INVENTION

1. Field of the Invention

The present invention relates to an equatorial telescope with a polar-axis telescope, and especially relates to a setting of the polar-axis telescope.

2. Description of the Related Art

In an equatorial telescope, a polar-axis telescope is firstly set so as to make the polar axis parallel to the rotation-axis of the earth. Namely, the optical axis of the polar-axis telescope, which is defined as a polar-axis, is set so as to be parallel to the rotation-axis by adjusting the position of the equatorial telescope mount. When observing a constellation in, for example, the Northern hemisphere, the Northern sky is aimed at by the polar-axis telescope. Then, the azimuth and altitude of the equatorial telescope mount are adjusted such that a specific target star, such as the polar star, appears at a proper position in the visual field of the polar-axis telescope.

After setting the polar-axis telescope, observed stars are aimed at by an astronomical telescope mounted on the equatorial telescope mount. The astronomical telescope is rotatable around the polar-axis, which enables the astronomical telescope to follow the target stars, with the passing of time, that is with the rotation of the earth. For example, a camera can be mounted on an eyepiece of the astronomical telescope, and a so called "bull photographing", which requires a long exposure time, is performed.

When photographing a constellation, highly precise setting of the polar-axis is required to, for ex ample, take a high-quality photograph. However, when the magnification of the polar-axis telescope is set to a large magnitude, the visual field becomes narrow, so that the target star cannot be easily aimed at. On the other hand, when the magnification is set to a small magnitude, the precision of the polar-axis setting degrades.

SUMMARY OF THE INVENTION

Therefore, an object of the present invention is to provide an equatorial telescope mount and a polar-axis telescope that can be easily aimed at a target star and for which the polar-axis can be set with high-precision. A polar-axis telescope according to the present invention is incorporated in an equatorial telescope. The polar-axis telescope has an objective lens, a focal plate, an eyepiece, a zoom optical system, and a zoom optical system driver. The objective lens forms an object image, and the focal plate is arranged on a focal plane of the objective lens. The eyepiece is arranged backward of the focal plate and forms an observed image.

In the present invention, the zoom optical system is arranged between the objective lens and the eyepiece. The zoom optical system makes the observed image appear gradually bigger while maintaining a focused-state. The zoom optical system driver shifts the zoom optical system along a polar-axis corresponding to the optical axis of the polar-axis telescope so as to change the magnification.

An equatorial telescope mount according to another aspects of the present invention has a polar-axis telescope, a polar-axis outer tube, a polar-axis inner tube, and a declination outer tube. The polar-axis telescope has an objective lens, a focal plate, and an eyepiece for forming an observed image. The polar-axis outer tube adjusts the azimuth and altitude of the polar-axis telescope. The polar-axis inner tube is provided in the polar-axis outer tube and is rotatable around the polar-axis relative to the polar-axis outer tube. The polar-axis telescope is installed in the polar-axis inner tube. The declination outer tube is operatively connected to the polar-axis inner tube and is rotatable around the polar-axis relative to the polar-axis outer tube.

In this invention, the polar-axis telescope has a zoom optical system and a zoom optical system driver. The zoom optical system is arranged between the objective lens and the eyepiece, and makes the observed image appear gradually bigger while maintaining a focused-state. The zoom optical system driver shifts the zoom optical system along the polar-axis corresponding to the optical axis of the polar-axis telescope so as to change a magnification.

BRIEF DESCRIPTION OF THE DRAWINGS

The present invention will be better understood from the description of the preferred embodiment of the invention set fourth below together with the accompanying drawings, in which.

DESCRIPTION OF THE PREFERRED EMBODIMENTS

Hereinafter, the preferred embodiment of the present invention is described with reference to the attached drawings.

Figure 1:
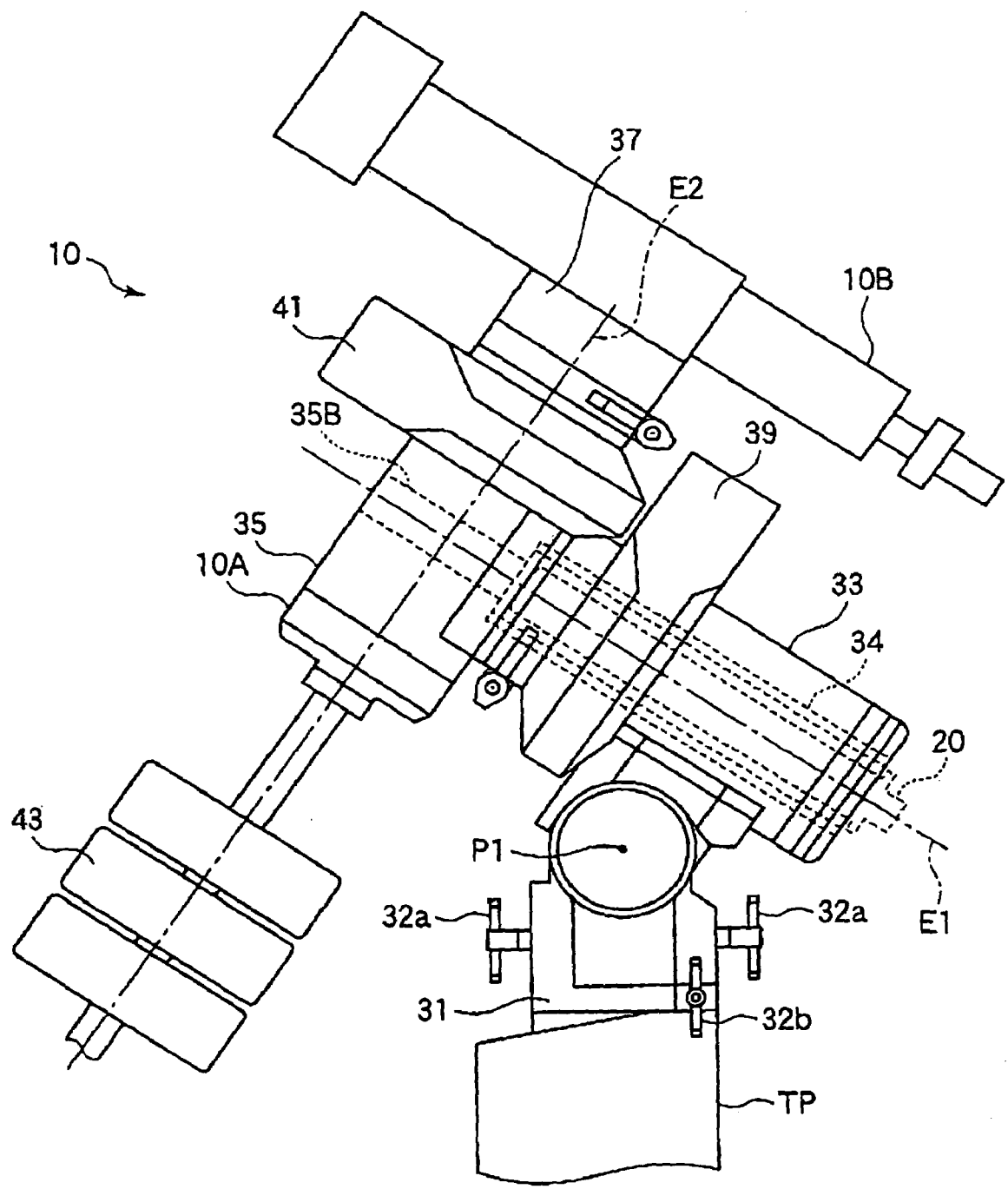
FIG. 1 is a schematic plan view of an equatorial telescope according to the present invention.

FIG. 1 is a schematic plan view of an equatorial telescope according to the present embodiment.

In an equatorial telescope 10, an astronomical telescope 10B is mounted on a polar-axis telescope 10A. The equatorial telescope mount 10A has a polar-axis outer tube 33 and a declination outer tube 35, and the polar-axis outer tube 33 is mounted on a pedestal 31, which is attached to a tripod TP. The polar-axis outer tube 33 is pivotable with respect to the horizontal plane and is pivotable around axis P1 to adjust the altitude. A polar-axis inner tube 34 is coaxially provided in the polar-axis outer tube 33, and is rotatable around a polar-axis E1 relative to the polar-axis outer tube 33. A polar-axis telescope 20 is installed in the polar-axis inner tube 34, and an opening portion 35B is formed in the declination outer tube 35 for aiming the polar-axis telescope 20 at a specific star. Note that, the optical axis of the polar-axis telescope 20 is defined as the polar-axis E1.

The declination outer tube 35 is fixed to the polar-axis inner tube 34 and is rotatable around the polar-axis E1 relative to the polar-axis outer tube 33. A cylindrical holder 37 mounted on an end portion of the declination outer tube 35 holds the astronomical telescope 10B. A balance weight 43 is attached to the other end portion of the declination outer tube 35. A declination inner tube (not shown) is coaxially provided in the declination outer tube 35, and is rotatable around the declination-axis E2 relative to the declination outer tube 35. The holder 37 is also rotatable around the declination-axis E2.

An altitude fine adjusting screw 32a, and an azimuth fine adjusting screw 32b are provided on the pedestal 31. The observer screws the altitude and azimuth fine adjusting screw 32a and 32b to adjust the altitude and the azimuth of the polar-axis telescope 20.

A polar-axis driver 39, which is mounted on the polar-axis outer tube 33, rotates the declination-axis outer tube 35 around the polar-axis E1 by rotating the polar-axis inner tube 34. On the other hand, a declination-axis driver 41, which is mounted on the declination-axis outer tube 35, rotates the holder 37 around the declination-axis E2.

Figure 2:
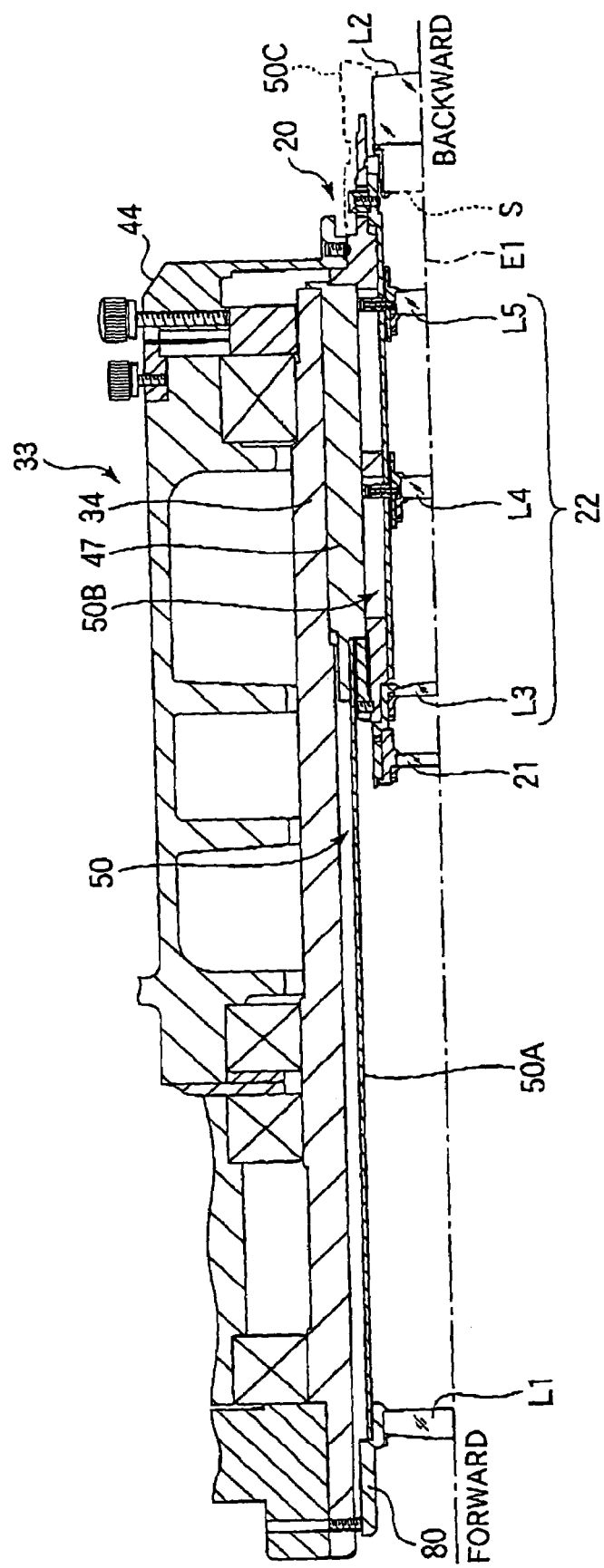
FIG. 2 is a schematic cross section view of the polar-axis outer tube.

FIG. 2 is a schematic cross section view of the polar-axis outer tube 33. Herein, the upper half portion of the polar-axis telescope 20, with respect to the optical axis, is shown as a schematic cross section. Especially, an end portion of the telescope 20 is schematically shown.

The polar-axis telescope 20, installed in the polar-axis inner tube 34, has a telescope tube 50, which is constructed of a first tube 50A, a second tube 50B, a sleeve 47, and an eyepiece portion 50C. The sleeve 47 is coaxially fitted in and fixed to the polar-axis inner tube 34. Therefore, the sleeve 47 rotates in accordance with the rotation of the polar-axis inner tube 34. The first tube 50A extends to the end portion of the sleeve 47 so as to cover the end portion of the second tube 50B. The eyepiece portion 50C is provided backward of the second tube 50B.

The first tube 50A is coaxially arranged in the polar-axis inner tube 34, and is securely attached to the sleeve 47, namely, the polar-axis inner tube 34. Therefore, the first tube 50A rotates in accordance with the rotation of the polar-axis inner tube 34. The second tube 50B is coaxially fitted into the sleeve 47, and is rotatable around the polar-axis E1 relative to the sleeve 47.

The polar-axis telescope 20 has an objective lens L1, a focus plate (focusing glass) 21, a zoom optical system 22, and an eyepiece L2. The zoom optical system 22 includes a condenser lens L3, a first zoom lens L4, and a second zoom lens L5. The objective lens L1 is located forward of the polar-axis telescope 20, which is opposite to the eyepiece portion 50C. The objective lens L1 arranged in the first tube 50A is supported by a lens-supporting frame 80, which is securely fixed to the first tube 50A and the polar-axis inner tube 34. The focal plate 21, arranged in the second tube 50B, is located at the middle position of the polar-axis telescope 20, and the eyepiece L2 is located in the eyepiece portion 50C. The zoom optical system 22 is arranged between the focal plate 21 and the eyepiece L2.

The light passes through the objective lens L1 so that the objective image is formed on the focal plate 21, and the light that exits from the focal plate 21 then passes through the zoom optical system 22. The zoom optical system 22 functions as a relay lens so that the object image is reformed at a position "S" along the polar-axis E1. The eyepiece lens L2 forms a magnified observed image so that the observer can watch the observed image via the eyepiece L2. The zoom optical system 22 further functions as an erecting optical system, therefore, an erect image is observed via the eyepiece L2. Then, the zoom optical system 22 changes the magnification of the observed image by shifting along the polar-axis E1.

Figure 3:
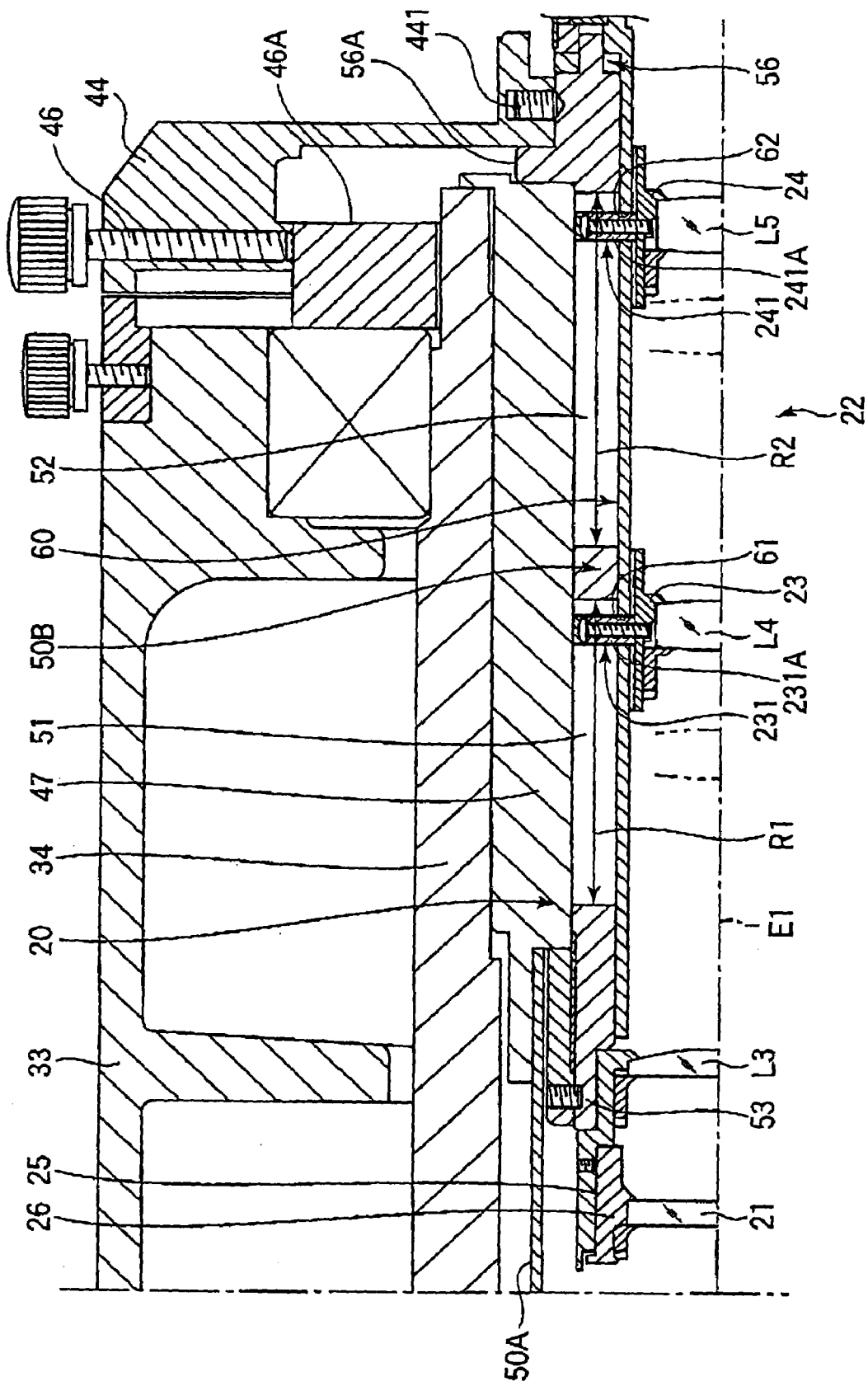
FIG. 3 is an enlarged cross section view of a part of the polar-axis telescope.
Figure 4:
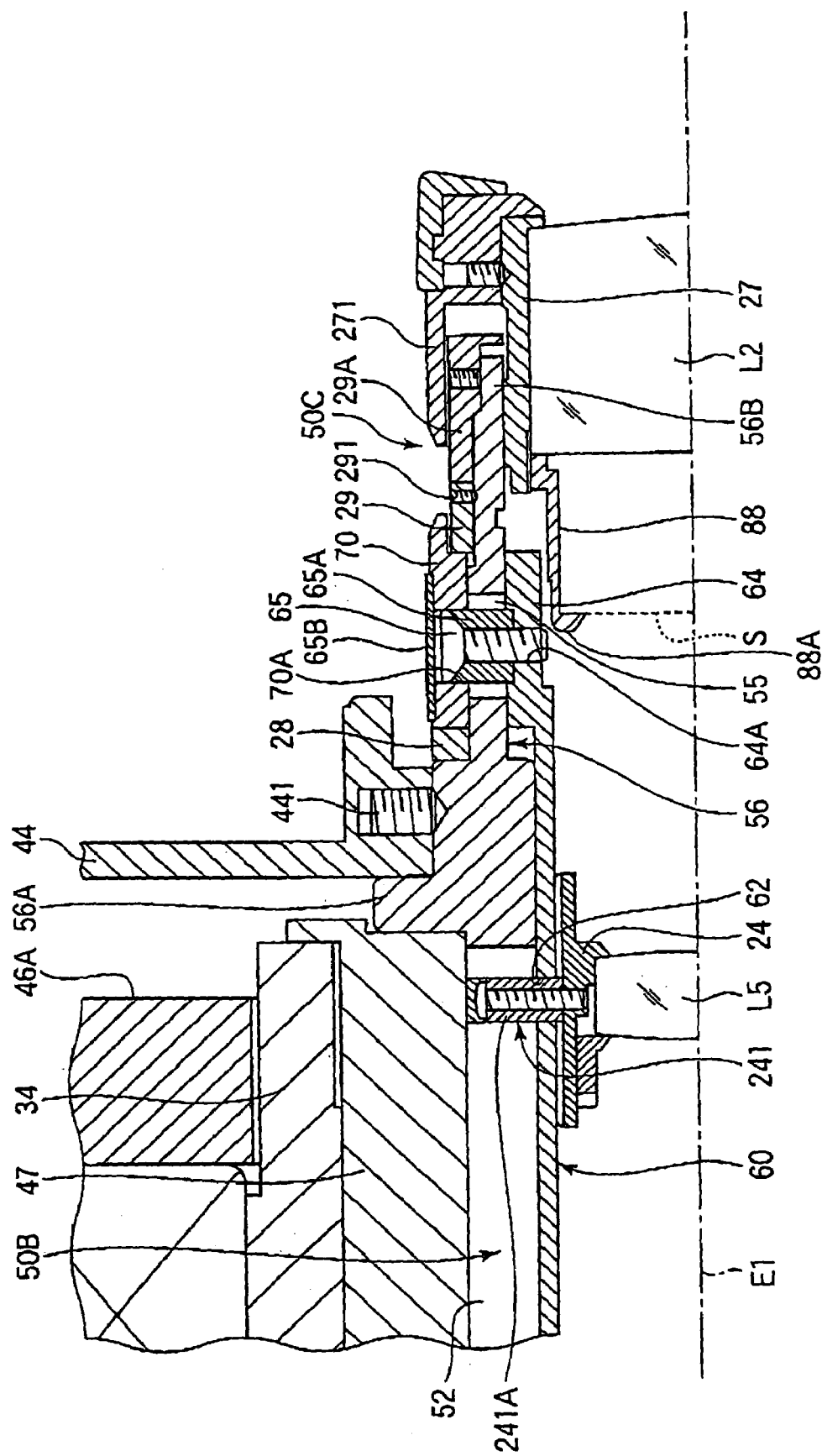
FIG. 4 is a cross section view of the eyepiece portion.

FIG. 3 is an enlarged cross section view of a part of the polar-axis telescope 20. FIG. 4 is a cross section view of the eyepiece portion 50C. Note that, the eyepiece portion 50C and the objective lens L1 are not shown in FIG. 3.

The focal plate 21 is supported by a lens-supporting frame 26, whereas the condenser lens L3 is supported by a lens-supporting frame 25. The lens-supporting frame 25 is securely fixed to the lens-supporting frame 26 and the second tube 50B so that the focal plate 21 and the condenser lens L3 is operatively connected with the second tube 50B.

On the inner surface of the second tube 50B, a straight guide slit 51 for guiding the first zoom lens L4 and a straight guide slit 52 for guiding the second zoom lens L5, are formed along a direction parallel to the polar-axis E1. The lengths of the guide slits 51 and 52 are respectively defined as "R1" and "R2".

A hollow cam tube 60 is coaxially fitted into the second tube 50B, and is rotatable around the polar-axis E1 relative to the second tube 50B. On the cam tube 60, slits 61 and 62 are formed in slanting directions relative to the polar-axis E1, so as to respectively draws helical line around the polar-axis E1 by a given length.

The first and second zoom lenses L4 and L5 are respectively supported by lens supporting-frames 23 and 24, which are slidably fitted into the inner surface of the cam tube 60 and are rotatable relative to the cam tube 60. Cam followers 231 and 232, which are covered by synthetic resins 231A and 241A, are respectively fixed to the lens-supporting frames 23 and 24, and extend into the guide slits 51 and 52 over the slits 61 and 62. In this way, the second tube 50B, and the cam followers 231 and 232, and the cam tube 60 construct a cam mechanism, wherein the rotating motion of the cam tube 60 results in the straight motion of the first and second zoom lens L4 and L5 along the polar-axis E1. The second tube 50B does not shift along the polar-axis E1 while the cam tube 60 rotates around the polar-axis E1.

As shown in FIG. 4, an end portion 56 of the second tube 50B, composed of a connecting portion 56A and an extending portion 56B, extends to the eyepiece L2. A slit 55 is formed circumferentially between the connecting portion 56A and the extending portion 56B so as to be opposite to an extending portion 64 of the cam tube 60. A zoom operation ring 70 is rotatably and coaxially arranged around the extending portion 56B so as to be opposite to the slit 55. A connecting pin 65, which is covered by a synthetic resin 65A, is threaded in a recess 64A formed in the extending portion 64 via the slit 55, and is securely fitted into a recess 70A formed in the zoom operation ring 70 to interlock the cam tube 60 to the zoom operation ring 70. The connecting pin 65 is covered by a rubber 65B.

A ring-shaped spacer 28 is coaxially arranged between the connecting portion 56A and the zoom operation ring 70. The spacer 28 touches the connecting portion 56A and the zoom operation ring 70. The spacer's thickness along the polar-axis E1 is set to a given thickness so that the position of the cam tube 60 relative to the second tube 50B is determined along the polar-axis E1. In manufacturing, the thickness of the spacer 28 can be adjusted to change the relative position of the cam tube 60.

In the eyepiece portion 50C, the eyepiece L2 is supported by a lens-supporting frame 27. A male screw, formed on the outer surface of the lens-supporting frame 27, engages with a female screw formed on the inner surface of the extending portion 56B. When adjusting the diopter, the eyepiece L2 is minutely shifted along the polar-axis E1 by rotating a diopter-adjusting ring 271 connected to the lens-supporting frame 27. A visual field ring 88 with a visual field frame 88a, which defines the position "S" of the reformed image, is securely attached to the lens-supporting frame 27.

A marker ring 29 is coaxially arranged backward of the zoom operation ring 70 and around the extending portion 56B. The marker ring 29 is securely fixed to the extending portion 56B of the second tube 50B by a screw 291.

Therefore, the marker ring 29 does not rotate in accordance with the rotation of the zoom operation ring 70 and the cam tube 60. However, the marker ring 29 does rotate in accordance with the rotation of the second tube 50B. An index is marked on the outer surface of the marker ring 29 to indicate the magnification scale marked on the outer surface of the zoom operation ring 70, or a diopter scale marked on the outer surface of the diopter-adjusting ring 271.

A nut 29A, which is coaxially arranged around the extending portion 56B, touches the marker ring 29, and urges the marker ring 29 toward the zoom operation ring 70. Male screws are formed on the inner surface of the nut 29A, and the nut 29A engages with female screws formed on the outer surface of the extending portion 56B. The nut 29A is screwed toward the zoom operation ring 70 so that the zoom operation ring 70 is urged toward the spacer 28 by the marker ring 29, and the spacer 28 is urged toward the connecting portion 56A by the zoom operation ring 70.

The rotation-resistance of the zoom operation ring 70 varies with the tightening-degree of the nut 29A. In manufacturing, the tightening-degree of the nut 29A is adjusted such that the rotation-operation becomes easy and comfortable for the observer by ensuring a proper rotation-resistance.

As shown in FIG. 3, a scale ring 44 is coaxially arranged around the connecting portion 56A of the second tube 50B so as to be opposite to the polar-axis outer tube 33. The scale ring 44 is fixed to the connecting portion 56A by a fixed screw 441. Further, the scale ring 44 is fastened to a base 46A by a fixed screw 46, and the base 46A is fixed to the polar-axis inner tube 34 by a screw (not shown). When screwing off the fixed screw 46, the scale ring 44 is rotatable around the polar-axis E1 relative to the polar-axis inner tube 34. A scale for adjusting the position of the polar star on the focal plate 21 is formed on the outer surface of the scale ring 44.

Figure 5:
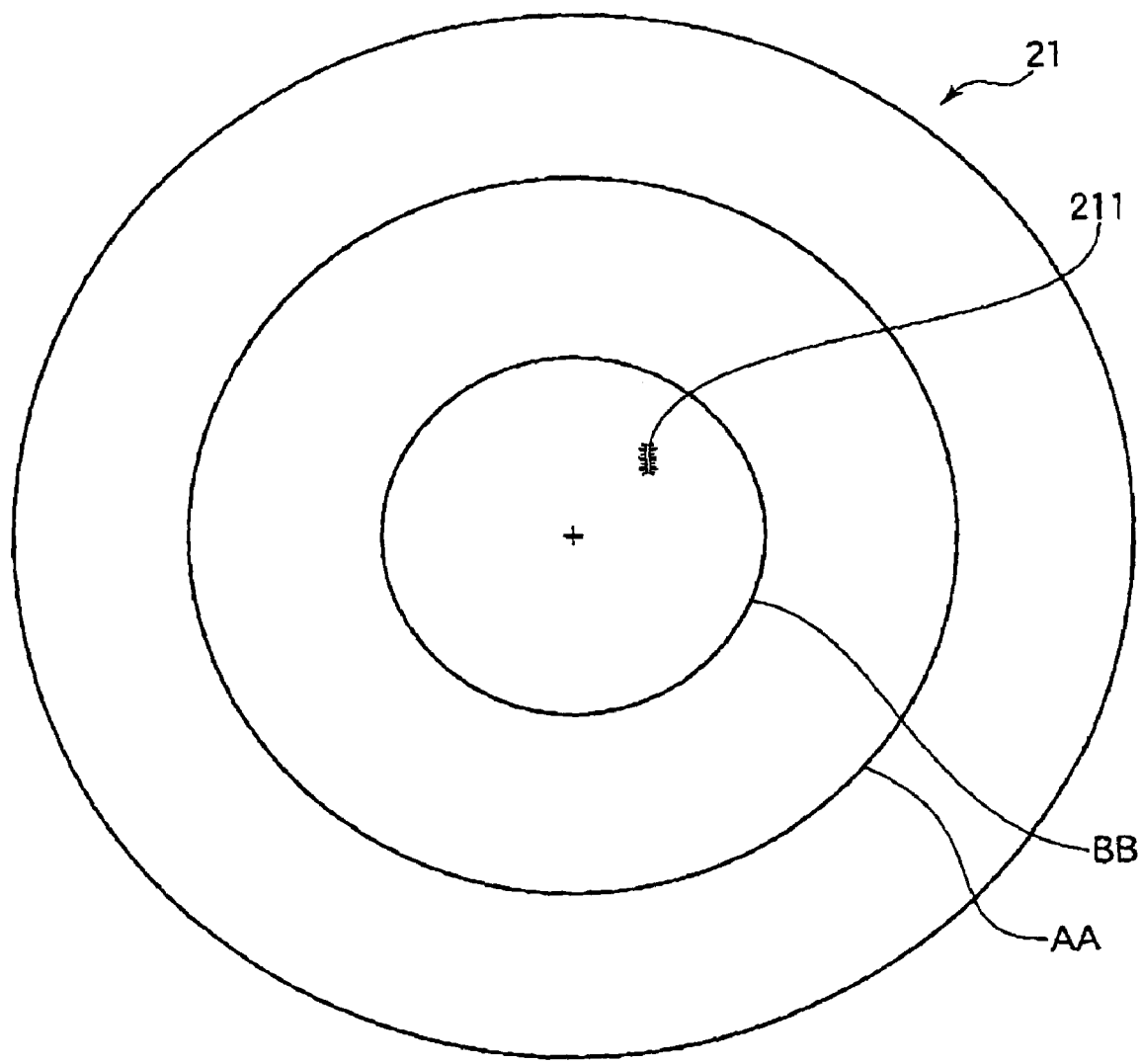
FIG. 5 is a view showing a focal plate.
Figure 6A:
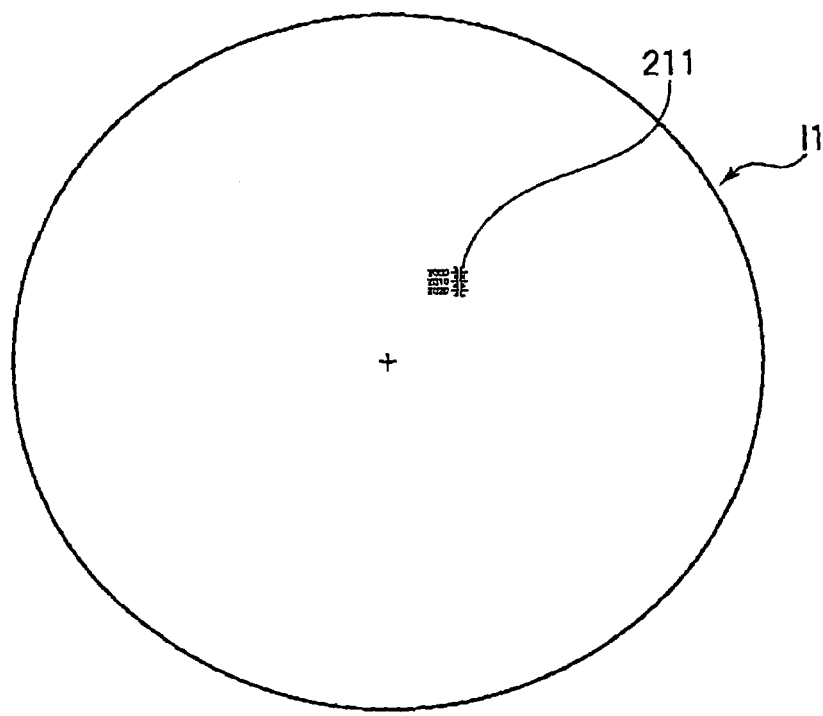
FIGS. 6A and 6B are views showing an observed image seen via the eyepiece.
Figure 6B:
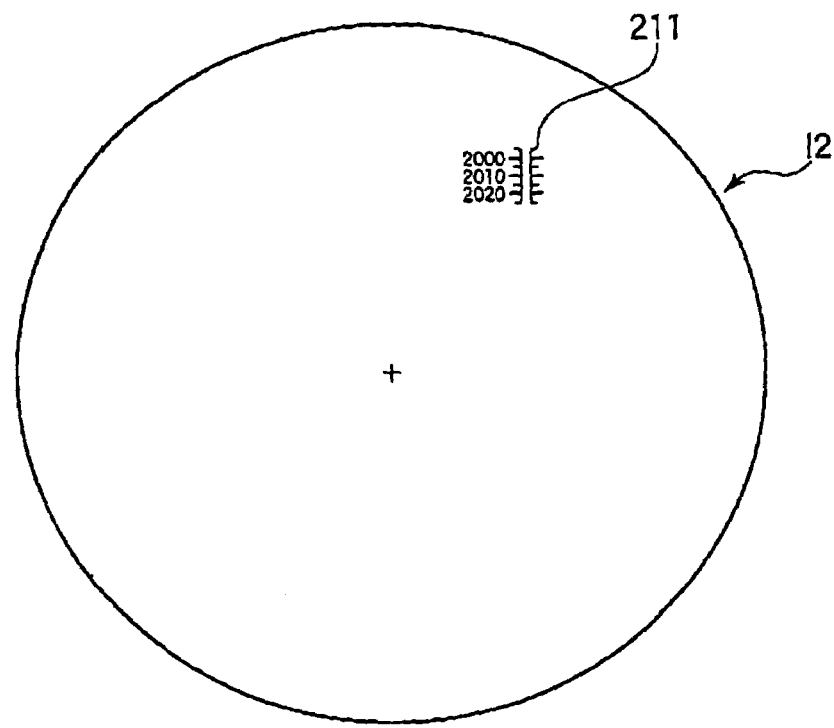

Hereinafter, the setting of the equatorial telescope 10 including the zoom-motion using the zoom optical system 22 is explained with reference to FIGS. 1 to 5 and FIGS. 6A and 6B. FIG. 5 is a view showing a focal plate 21. FIGS. 6A and 6B are views showing an observed image seen via the eyepiece L2.

As shown in FIG. 5, a scale 211 for positioning the polar star is formed on the focal plate 21. A position of the polar star relative to the polar-axis E1, namely, relative to the center portion in the visual field seen via the eyepiece L2, varies with the passing of time. Accordingly, firstly, the fixed screw 46 is screwed off and the scale ring 44 is rotated by a given amount to adjust the position of the scale 211.

Since the scale ring 44 and the focal plate 21 are interlocked with the second tube 50B, the focal plate 21 rotates around the polar-axis E1 in accordance with the rotation of the scale ring 44. The observer rotates the scale ring 44 by a given amount in accordance with the present time. Thus, the position of the scale 211 moves around the center portion of the focal plate 21 and to the proper position corresponding to the present time. After the position of the scale 211 is adjusted, the fixed screw 46 is screwed off and securely fastened to the base 46A fixed to the polar-axis inner tube 34.

Next, the magnification of the polar-axis telescope 20 is set to a lowest magnitude by operating the zoom operation ring 70. Then, the polar-axis telescope 20 is trained toward the polar star by adjusting the position of the polar-axis outer tube 33. When the polar star can be targeted, or observed via the eyepiece L2, the azimuth and altitude of the polar-axis telescope 20 is coarsely adjusted by changing the position of the polar-axis outer tube 33, such that the position of the polar star generally coincides with the center point in the visual field.

After the above coarse adjustment, the zoom operation ring 70 is rotated by the observer so as to perform the zoom motion, namely, to increase or to decrease the magnification continuously while maintaining the focused-situation.

As described above, the zoom operation ring 70 is interlocked with the cam tube 60. Therefore, when the zoom operation ring 70 rotates, the cam tube 60 rotates. On the other hand, the end portion 56 of the second tube 50B is interlocked to the scale ring 44 by the fixed screw 441, and the scale ring 44 is fastened to the polar-axis inner tube 34 by the fixed screw 46. Therefore, when the cam tube 60 rotates, the second tube 50B does not rotate in accordance with the rotation of the cam tube 60. Instead, as the cam tube 60 rotates, the cam followers 231 and 241 respectively move along the slits 61 and 62 relative to the cam ring 60, and shift along the straight guide slits 51 and 52 relative to the second tube 50B. Thus, the first and second zoom lenses L4 and L5 shift along the polar-axis E1 while changing the relative interval. During shifting, the first and second zoom lenses L4 and L5 do not rotate. For example, the first and second zoom lenses L4 and L5 respectively shift to positions shown by the broken lines in FIG. 3.

On the other hand, the objective lens L1 is operatively connected to the polar-axis inner tube 34, and the focal plate 21 and the condenser lens L3 are operatively connected to the second tube 50B. Therefore, the objective lens L1, the focal plate 21, and the condenser lens L3 do not rotate and shift along the polar-axis E1 while the cam tube 60 rotates due to the rotation of the zoom operation ring 70. Further, the eyepiece L2 is operatively connected to the second tube 50B by the engagement of the lens-supporting frame 27 with the extending portion 56B of the second tube 50B. Therefore, the eyepiece L2 also does not rotate and shift along the polar-axis E1 while the cam tube 60 rotates.

Using the zoom motion, the observed image captured by the polar-axis telescope 20 becomes gradually bigger. In this embodiment, the magnification can be continuously adjusted between 9 and 18. In FIG. 5, the visual field in a situation where the magnification is "8" is shown by a circle "AA". Whereas, the visual field corresponding to a magnification of "16" is shown by a circle "BB". In FIGS. 6A and 6B, the observed image "I1" corresponding to the magnification "8" and the observed image "I2" corresponding to the magnification "16", which are confirmed via the eyepiece L2, are shown.

After the zoom motion is performed, the position of the polar star is minutely adjusted. Namely, the position of the polar star observed via the eyepiece L2 is confirmed, and then the altitude fine adjusting knob 32a and the azimuth fine adjusting knob 32b are operated such that the position of the polar star coincides with the position of the scale 211. Thus, the position of the polar star is precisely set.

When the setting of the polar-axis telescope 20 is finished, to follow the polar star, which gradually moves in the sky as the time passes, the polar-axis driver 35 shown in FIG. 1 rotates the polar-axis inner tube 34 around the polar-axis E1 so that the declination outer tube 35 rotates around the polar-axis E1.

In this way, in this embodiment, the telescope 20 has the zoom optical system 22 and the first and second zoom lenses L4 and L5 can be shifted along the polar-axis E1 by rotating the zoom operation ring 70 to perform the zoom motion.

After the polar star is sighted with low magnification, the observer can change the magnification by carrying out the zoom function while watching the polar star and confirming the position of the polar star via the eyepiece L2, without the polar star being out of visual field. Thus, the precise setting of the polar-axis telescope 20 can be easily performed. Further, since the observer can select the magnification, the magnification may be changed to a proper magnitude (not to a maximum magnification) in accordance with the performance of the astronomical telescope 10B.

Since the zoom optical system 22 is arranged between the focal plate 21 and the eyepiece L2, namely, no zoom lens exists between the objective lens L1 and the focal plate 21, the objective lens L1 and the focal plate 21 can be precisely arranged and the object image is precisely formed on the focal plate 21. Even when an optical-axis deviation with respect to the first and the second zoom lenses L4 and L5 occurs, the position of the polar star on the focal plate 21 does not change. Accordingly, the precision of the setting does not degrade.

Since the zoom optical system functions as a relay optical system and an erect optical system, the observed image is an erect image. Thus, the observer can easily judge the moving-direction of the polar-axis outer tube 33 and can adjust the position of the polar-axis telescope 20.

The eyepiece L2 is operatively connected to the second tube 50B, and the eyepiece L2 does not rotate around and shift along the polar-axis E1 while the zoom-motion is performed. Therefore, the observer can easily follow the polar star during the zoom motion, and the adjusted diopter is not changed. Further, since the zoom operation ring 70 is arranged close to the eyepiece L2 relative to the zoom optical system 22, the observer can properly manipulate the ring 70 while following the observed image via the eyepiece L2.

The straight guiding slits 51 and 52 formed on the second tube 50B may be formed so as to draw a spiral line around the polar-axis E1 in accordance with the formed-direction of the slits 61 and 62. In this case, the first and second zoom lenses L4 and L5 shift along the polar-axis with the rotation. In place of guiding slits 51, 52 and the slits 61, 62, extending teeth and grooves may be respectively formed on the outer surface of the cam tube 60 and the inner surface of the second tube 50B. Other cam mechanisms may be applied to the polar-axis telescope 20. Further, other driver mechanism for shifting the zoom optical system 22 may be applied to the polar-axis telescope 20.

The zoom optical system may be constructed from any combination of various lenses. In place of the zoom operation ring 70, an automatic rotation mechanism for rotating the cam tube 50B by an actuator, may be applied to the polar-axis telescope 20.

Finally, it will be understood by those skilled in the art that the foregoing description is of preferred embodiments of the device, and that various changes and modifications may be made to the present invention without departing from the spirit and scope thereof.

The present disclosure relates to subject matters contained in Japanese Patent Application No.2002-382480 (filed on Dec. 27, 2002) which is expressly incorporated herein, by reference, in its entirety.

What is claimed is:

1. A polar-axis telescope incorporated in an equatorial telescope comprising:
   an objective lens that forms an object image;
   a focal plate that is located on a focal plane of said objective lens;
   an eyepiece that is located on an opposite side of said focal plate with respect to said objective lens and that forms an observed image;
   a zoom optical system that is located between said focal plate and said eyepiece, and that makes the observed image appear gradually bigger while maintaining an in-focus condition and that relays the object image formed on said focal plate to said eyepiece; and
   a zoom optical system driver that shifts said zoom optical system along a polar-axis, corresponding to an optical axis of said polar-axis telescope, so as to change a magnification.

2. The polar-axis telescope of claim 1, wherein said zoom optical system driver includes a cam mechanism that comprises a cam tube, a guiding tube arranged coaxial to said cam tube, and a cam follower connected to said cam tube and said guiding tube, said cam mechanism shifting said zoom optical system along the polar-axis in accordance with a rotation of said cam tube.

3. The polar-axis telescope of claim 2, further comprising a scale ring that is operatively connected to said guiding tube and that is rotatable around the polar-axis relative to said cam tube, to adjust a position of a scale formed on said focal plate;
   wherein said focal plate is operatively connected to said guiding tube, and rotates around the polar-axis by rotation of said scale ring so as to set the scale to a position corresponding to a present observed time.

4. The polar-axis telescope of claim 2, wherein said eyepiece is operatively connected to said guiding tube such that said eyepiece does not rotate in accordance with the rotation of said cam tube.

5. The polar-axis telescope of claim 2, further comprising a zoom operation member that rotates said cam tube in accordance with an operation of said zoom operation member.

6. The polar-axis telescope of claim 5, wherein said zoom operation member is ring-shaped and is arranged adjacent to said eyepiece relative to said zoom optical system.

7. The polar-axis telescope of claim 5, further comprising a spacer that is arranged between said guiding tube and said cam tube to adjust a position of said cam tube along the polar-axis relative to said guiding tube.

8. The polar-axis telescope of claim 5, further comprising a nut that engages with an outer surface of said guiding tube, and that is arranged backward of said zoom operation member so as to press said zoom operation ring, said nut being turned to adjust a rotation-resistance of said zoom operation ring.

9. The polar-axis telescope of claim 1, wherein said zoom optical system driver comprises:
   a cam tube that accommodates said zoom optical system, and has a moving channel formed on said cam tube;
   a guide tube that is coaxially arranged around said cam tube, and that has a guiding channel that guides said zoom optical system along a polar-axis, said cam tube being rotatable around the polar-axis relative to said guiding tube, said guiding tube being restrained so as not to rotate while said cam tube rotates; and
   a cam follower that is operatively connected to said zoom optical system and that transmits the rotational-motion of said cam tube to said guide ring.

10. The polar-axis telescope of claim 9, wherein said guiding channel is formed along the polar-axis, said moving channel being formed in a direction skewed with respect to the polar-axis so as to define a helical line around said polar-axis, said cam follower moving along the guiding channel.

11. The polar-axis telescope of claim 1, wherein said zoom optical system comprises an erecting optical system.

12. The polar-axis telescope of claim 1, wherein said zoom optical system comprises a condenser lens, a first zoom lens, and a second zoom lens, said first and second zoom lens moving along the polar-axis.

13. The polar-axis telescope of claim 1, wherein said zoom optical system comprises a relay optical system.

14. An equatorial telescope mount comprising:
   a polar-axis telescope that comprises an objective lens, a focal plate, and an eyepiece for forming an observed image;
   a polar-axis outer tube that adjusts the azimuth and altitude of said polar-axis telescope;
   a polar-axis inner tube that is provided in said polar-axis outer tube and that is rotatable around the polar-axis relative to said polar-axis outer tube, said polar-axis telescope being installed in said polar-axis inner tube; and
   a declination outer tube that is operatively connected to said polar-axis inner tube and that is rotatable around the polar-axis relative to said polar-axis outer tube;
   wherein said polar-axis telescope comprises:
   a zoom optical system that is located between said focal plate and said eyepiece, and that makes the observed image appear gradually bigger while maintaining an in-focus condition and that relays the object image formed on said focal plate to said eyepiece; and
   a zoom optical system driver that shifts said zoom optical system along a polar-axis, corresponding to an optical axis of said polar-axis telescope, so as to change a magnification.

15. The equatorial telescope mount according to claim 14, wherein said zoom optical system driver comprises a cam mechanism that includes a cam tube, a guiding tube coaxially positioned with respect to said cam tube, and a cam follower connected to said cam tube and to said guiding tube, said cam mechanism shifting said zoom optical system along the polar axis in accordance with a rotation of said cam tube.

16. The equatorial telescope mount according to claim 15, further comprising a zoom operation member that rotates said cam tube.

17. The equatorial telescope mount according to claim 14, wherein said zoom optical system comprises an erecting optical system.

18. The equatorial telescope mount according to claim 14, wherein said zoom optical system comprises a condenser lens, a first zoom lens, and a second zoom lens, said first and second zoom lenses moving along the polar axis.

19. The equatorial telescope mount according to claim 14, wherein said zoom optical system comprises a relay optical system.

20. A polar axis telescope for use in an equatorial telescope, said polar axis telescope comprising:
   an objective lens that forms an image of an object;
   a focal plate that is located on a focal plane of said objective lens;
   an eyepiece that is located on an opposite side of said focal plate with respect to said objective lens and forms an observed image;
   a zoom optical system that is located between said objective lens and said eyepiece, said zoom optical system configured to make the observed image appear gradually larger while maintaining an in-focus condition; and
   a zoom optical system driver that shifts said optical system along a polar axis corresponding to an optical axis of said polar axis telescope so as to change a magnification, said zoom optical system driver comprising a cam mechanism that includes a cam tube, a guiding tube arranged coaxially to said cam tube and a cam follower connected to said cam tube and to said guiding tube, said cam mechanism shifting said zoom optical system along the polar axis in accordance with a rotation of said cam tube.

* * * * *